(12) United States Patent
Lee

(10) Patent No.: US 11,382,726 B2
(45) Date of Patent: Jul. 12, 2022

(54) DIGITAL CUSTOM DENTURE IMPRESSION TRAY

(71) Applicant: Joshua Lee, Hawthorne, NJ (US)

(72) Inventor: Joshua Lee, Hawthorne, NJ (US)

( * ) Notice: Subject to any disclaimer, the term of this patent is extended or adjusted under 35 U.S.C. 154(b) by 643 days.

(21) Appl. No.: 16/403,848

(22) Filed: May 6, 2019

(65) Prior Publication Data

US 2020/0352685 A1 Nov. 12, 2020

(51) Int. Cl.
*A61C 9/00* (2006.01)

(52) U.S. Cl.
CPC .......... *A61C 9/0006* (2013.01); *A61C 9/004* (2013.01)

(58) Field of Classification Search
CPC ..... A61C 9/0006; A61C 9/004; A61C 11/001; A61C 11/003; A61C 11/06; A61C 19/05
See application file for complete search history.

(56) References Cited

U.S. PATENT DOCUMENTS

| | | | | |
|---|---|---|---|---|
| 90,706 A | * | 6/1869 | Vonn Bonnhorst | A61C 11/06 433/55 |
| 1,485,657 A | * | 3/1924 | Williams | A61C 11/082 433/64 |
| 1,553,492 A | * | 9/1925 | Williams | A61C 11/001 433/56 |
| 1,722,306 A | * | 7/1929 | Peterson | A61C 11/003 433/63 |
| 2,003,727 A | * | 6/1935 | Tofflemire | A61C 11/08 433/55 |
| 2,426,388 A | | 8/1947 | Chartrand | |
| 2,510,152 A | * | 6/1950 | Stoll | A61C 11/02 33/513 |
| 2,685,137 A | | 8/1954 | Thompson | |
| 2,748,481 A | * | 6/1956 | Glueck | A61C 11/022 433/56 |
| 2,754,589 A | * | 7/1956 | Highkin | A61C 11/02 433/214 |
| 3,890,711 A | | 6/1975 | Burns | |
| 4,375,965 A | | 3/1983 | Weissman | |
| 4,624,639 A | * | 11/1986 | Wong | A61C 11/006 433/56 |

(Continued)

*Primary Examiner* — Nicholas D Lucchesi
(74) *Attorney, Agent, or Firm* — JIKIM LLC—Attorneys at Law; Jisang Kim, Esq

(57) ABSTRACT

The present invention is a digital custom denture impression tray that includes an upper U-shaped plate to measure the shape of a patient's upper gum having missing teeth and normal teeth arranged therein; a lower U-shaped plate to measure the shape of the patient's lower gum having missing teeth and normal teeth arranged therein; a height adjustment unit disposed on the upper plate for measuring the height of the denture to be implanted and structured to adjust horizontality and height of the upper plate and the lower plate; a screw nut attached to the height adjustment unit having a threaded hole at a predetermined depth; a screw bolt having a threaded surface to adjust height by being inserted in the threaded hole from under the screw nut; an indicator teeth disposed on the front center of the upper plate for recording centric relation and guiding the upper plate toward the lower plate; a front corresponding cooperation spot provided on the lower plate for receiving the indicator teeth thereon; and a rear corresponding cooperation spot provided on the lower plate for receiving the screw bolt thereon.

20 Claims, 5 Drawing Sheets

(56) References Cited

U.S. PATENT DOCUMENTS

| | | | | |
|---|---|---|---|---|
| 4,764,113 A | * | 8/1988 | Hiranuma | A61C 11/022 433/59 |
| 4,886,453 A | * | 12/1989 | Ludwigs | A61C 11/08 433/54 |
| 5,049,075 A | * | 9/1991 | Barrut | A61C 13/00 433/167 |
| 5,281,135 A | * | 1/1994 | Schwestka-Polly | A61C 11/00 433/56 |
| 5,340,308 A | | 8/1994 | Cukjati | |
| 6,196,840 B1 | | 3/2001 | Zentz | |
| 6,302,690 B1 | | 10/2001 | Brandhorst | |
| 6,386,868 B1 | * | 5/2002 | Fujita | A61C 11/082 433/56 |
| 6,929,473 B2 | | 8/2005 | Kwon | |
| 2004/0241607 A1 | * | 12/2004 | Slavicek | A61C 11/06 433/59 |
| 2005/0112523 A1 | * | 5/2005 | Massad | A61C 11/06 433/68 |
| 2014/0272776 A1 | * | 9/2014 | Cho | A61C 9/0006 433/44 |
| 2016/0106525 A1 | | 4/2016 | Kim | |
| 2018/0338819 A1 | * | 11/2018 | Chou | A61C 13/0004 |
| 2019/0038386 A1 | * | 2/2019 | Yamaguchi | A61C 11/006 |
| 2019/0358000 A1 | * | 11/2019 | Chou | A61C 9/0006 |

\* cited by examiner

DIGITAL CUSTOM DENTURE IMPRESSION TRAY

TECHNICAL FIELD & BACKGROUND

The present invention generally related to a digital custom denture impression tray, and in particular, to an improved digital custom denture impression tray.

A denture is a removable replacement for missing teeth and surrounding tissues. Two types of dentures are available—complete and partial dentures. Complete dentures are used when all the teeth are missing, while partial dentures are used when some nature teeth remain.

Dentures require several steps, as well as several visits to the office to complete, as well as for adjusting the denture for the best possible fit. A typical full or partial denture takes about 10 weeks for the full process to be complete.

The steps involved in making a denture are as follows: (1) the dentist will take an impression of a patient's gums; (2) Wax rims are placed in the mouth to establish a proper bite and orientation of the teeth; and (3) The dental lab will send a mockup of the patient's denture, which includes a set of pre-made plastic teeth, set in wax, to make sure that the patient satisfies the general color, look, fit and feel of the denture. If any changes are needed, additional visits for the patient may be necessary. Once the denture is made to such satisfaction, the try-in denture will be sent back to the lab to create the final denture.

As described above, the conventional steps involved in making a denture generally require at least 5 or 7 separate visits to the dental office by a patient.

This kind of traditional method inconveniences the patient by repetitively measuring the height and vertical and centric relations of denture by adjustment of a wax rim. Further, it also increases the medical treatment cost by requiring such repeated measurements of denture.

Therefore, it would be desirable to provide an improved digital custom denture impression tray that could eliminate such repeated measurements by adjustment of a wax rim and reduce the amount of time and cost required.

SUMMARY OF THE INVENTION

The present invention is directed to an improved digital custom denture impression tray that overcomes the above-mentioned disadvantages of the prior art.

In one aspect, the present invention provides a digital custom denture impression tray having an upper U-shaped plate, a lower U-shaped plate, a height adjustment unit, a screw nut, a screw bolt, an indicator teeth, a front corresponding cooperation spot, and a rear corresponding cooperation spot. The upper U-shaped plate is to measure the shape of a patient's upper gum having missing teeth and normal teeth arranged therein. The lower U-shaped plate is to measure the shape of the patient's lower gum, having missing teeth and normal teeth arranged therein. The upper plate and the lower plate are adapted to be inserted in the mouth of the patient in superimposed relation. The height adjustment unit is disposed on the upper plate for measuring the height of the denture to be implanted. The height adjustment unit is structured to adjust horizontality and height of the upper plate and the lower plate. The screw nut is attached to the height adjustment unit. The screw nut has a threaded hole at a predetermined depth. The screw bolt has a threaded surface to adjust height by being inserted in the threaded hole from under the screw nut. The indicator teeth is disposed on the front center of the upper plate for recording centric relation and guiding the upper plate toward the lower plate. The front corresponding cooperating spot is provided on the lower plate for receiving the indicator teeth thereon. The rear corresponding cooperating spot is provided on the lower plate for receiving the screw bolt thereon.

In another aspect, the present invention provides a digital custom denture impression tray having an upper U-shaped plate, a lower U-shaped plate, a height adjustment unit, and an indicator teeth. The upper U-shaped plate is to measure the shape of a patient's upper gum having missing teeth and normal teeth arranged therein. The lower U-shaped plate is to measure the shape of the patient's lower gum, having missing teeth and normal teeth arranged therein. The upper plate and the lower plate are adapted to be inserted in the mouth of the patient in superimposed relation. The height adjustment unit is disposed on the upper plate for measuring the height of the denture to be implanted. The height adjustment unit is structured to adjust horizontality and height of the upper plate and the lower plate. The indicator teeth is disposed on the front center of the upper plate for recording centric relation and guiding the upper plate toward the lower plate.

In a further aspect, the present invention provides a digital custom denture impression tray having an upper U-shaped plate, a lower U-shaped plate, a screw nut, a screw bolt, an indicator teeth, a front corresponding cooperation spot, and a rear corresponding cooperation spot. The upper U-shaped plate is to measure the shape of a patient's upper gum having missing teeth and normal teeth arranged therein. The lower U-shaped plate is to measure the shape of the patient's lower gum, having missing teeth and normal teeth arranged therein. The upper plate and the lower plate are adapted to be inserted in the mouth of the patient in superimposed relation. The screw nut is attached to the upper U-shaped plate. The screw nut has a threaded hole at a predetermined depth. The screw bolt has a threaded surface to adjust height by being inserted in the threaded hole from under the screw nut. The indicator teeth is disposed on the front center of the upper plate for recording centric relation and guiding the upper plate toward the lower plate. The front corresponding cooperating spot is provided on the lower plate for receiving the indicator teeth thereon. The front corresponding cooperating spot has a channeled surface. The rear corresponding cooperating spot is provided on the lower plate for receiving the screw bolt thereon.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
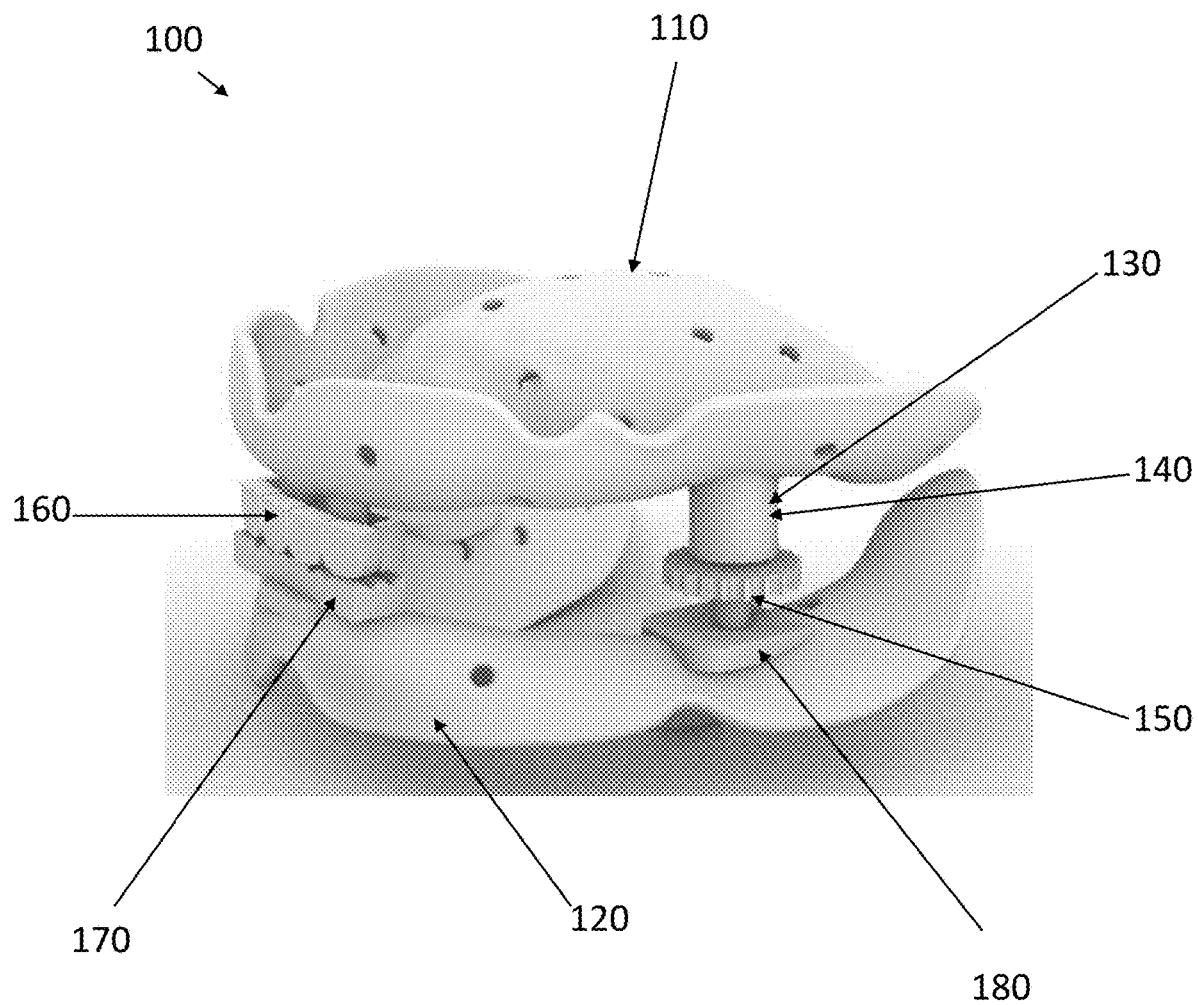
FIG. 1A illustrates a perspective view of a digital custom denture impression tray, in accordance with one embodiment of the present invention.
Figure 1B:
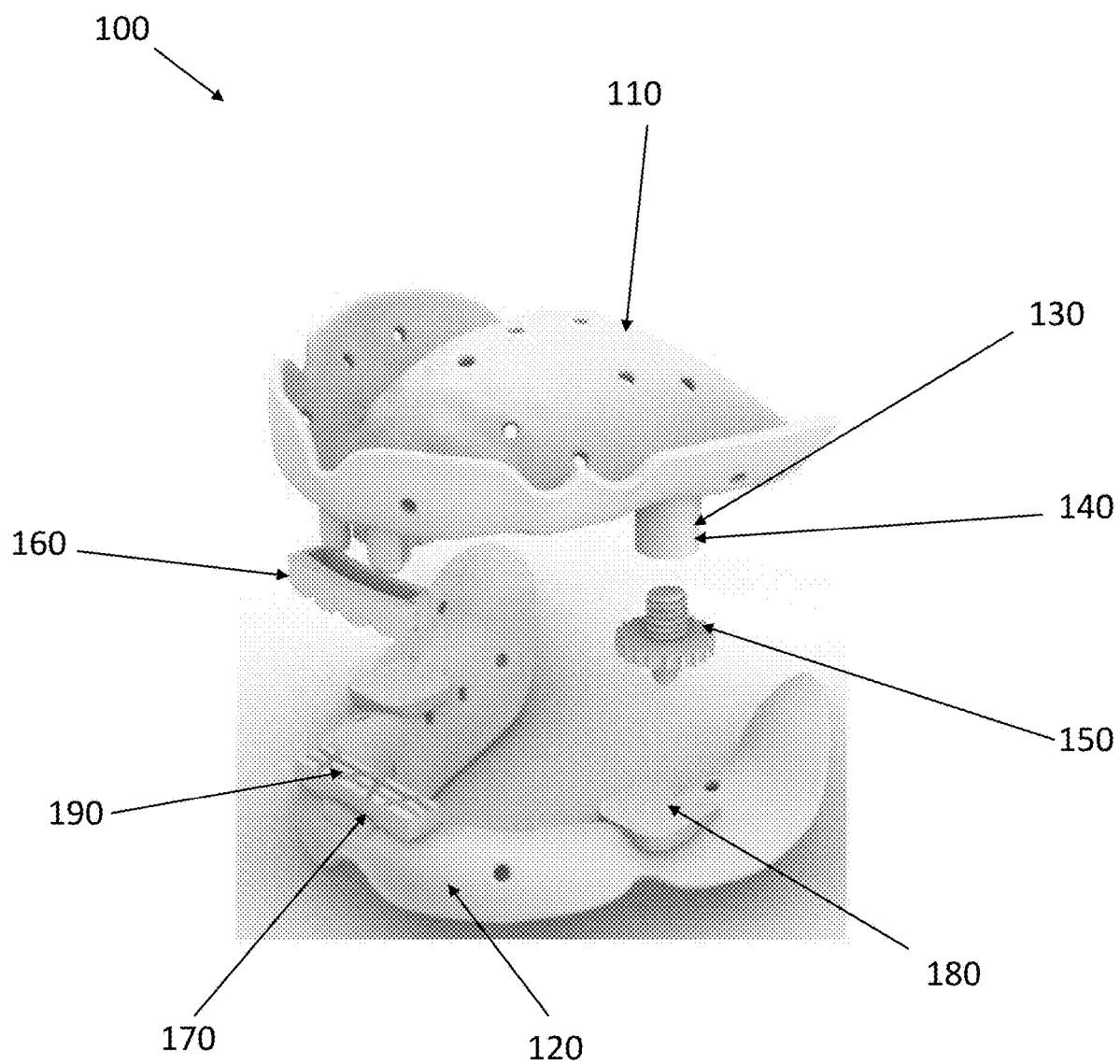
FIG. 1B illustrates an exploded perspective view of a digital custom denture impression tray, in accordance with one embodiment of the present invention.
Figure 3:
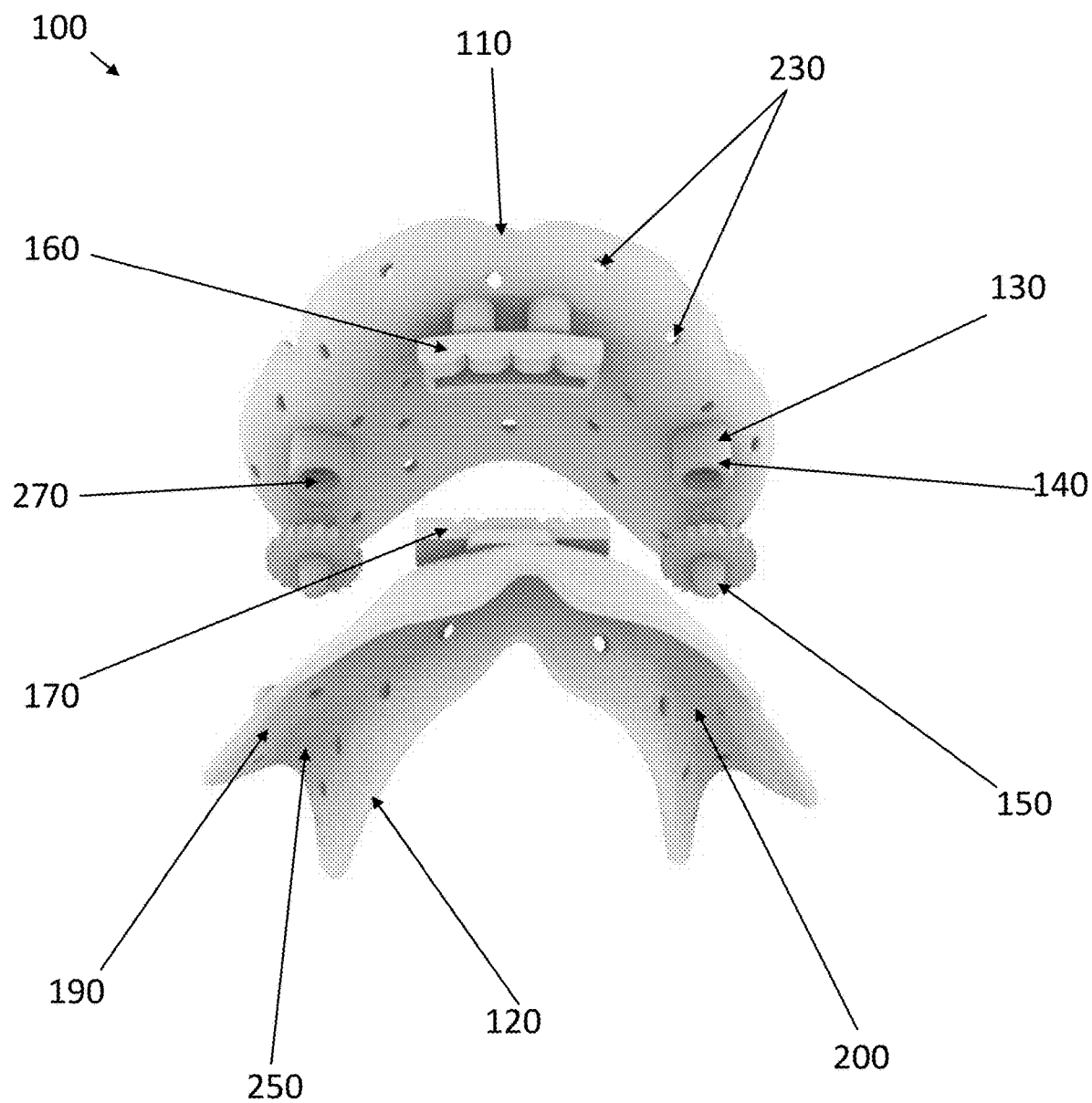
FIG. 3 illustrates an exploded bottom view of a digital custom denture impression tray, in accordance with one embodiment of the present invention.
Figure 4:
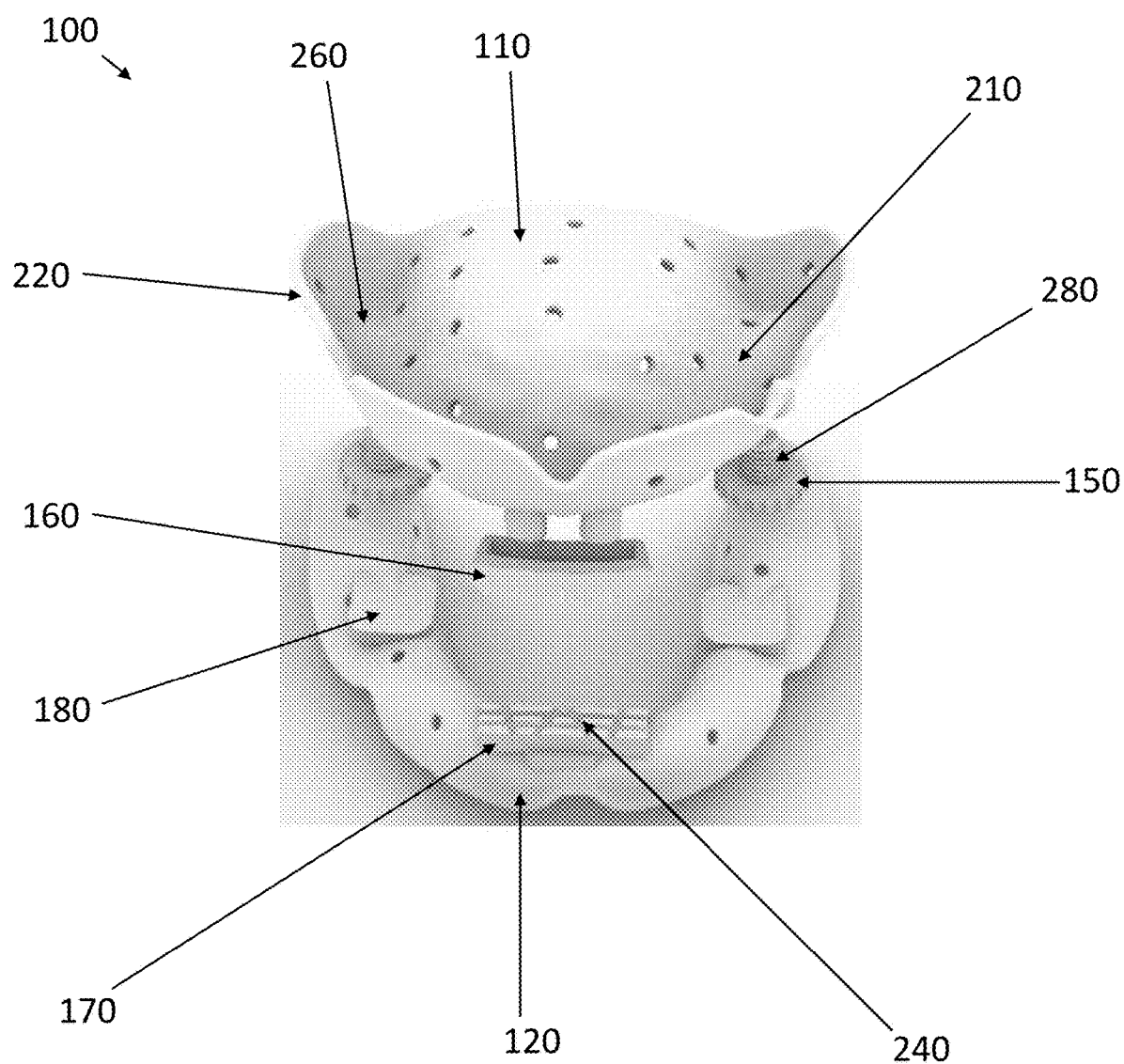
FIG. 4 illustrates an exploded top view of a digital custom denture impression tray, in accordance with one embodiment of the present invention.

FIG. 1A illustrates a perspective vie of a digital custom denture impression tray 100, in accordance with one embodiment of the present invention. FIG. 1B illustrates an exploded perspective view of a digital custom denture impression tray 100, in accordance with one embodiment of the present invention. FIG. 3 illustrates an exploded bottom view of a digital custom denture impression tray 100, in accordance with one embodiment of the present invention. FIG. 4 illustrates an exploded top view of a digital custom denture impression tray 100, in accordance with one embodiment of the present invention.

Referring to FIGS. 1A, 1B, 3 and 4, a digital custom denture impression tray 100 having an upper U-shaped plate 110, a lower U-shaped plate 120, a height adjustment unit 130, a screw nut 140, a screw bolt 150, an indicator teeth 160, a front corresponding cooperation spot 170, and a rear corresponding cooperation spot 180. The upper U-shaped plate 110 is to measure the shape of a patient's upper gum having missing teeth and normal teeth arranged therein. The lower U-shaped plate 120 is to measure the shape of the patient's lower gum, having missing teeth and normal teeth arranged therein. The upper plate 110 and the lower plate 120 are adapted to be inserted in the mouth of the patient in superimposed relation. The height adjustment unit 130 is disposed on the upper plate 110 for measuring the height of the denture to be implanted. The height adjustment unit 130 is structured to adjust horizontality and height of the upper plate 110 and the lower plate 120. The screw nut 140 is attached to the height adjustment unit 130. Alternatively, the screw nut 140 can be attached to the upper U-shaped plate 110. The screw nut 140 has a threaded hole 270 at a predetermined depth. The screw bolt 150 has a threaded surface 280 to adjust height by being inserted in the threaded hole 270 from under the screw nut 140. The indicator teeth 160 is disposed on the front center of the upper plate 110 for recording centric relation and guiding the upper plate 110 toward the lower plate 120. The front corresponding cooperating spot 170 is provided on the lower plate 120 for receiving the indicator teeth 160 thereon. The front corresponding cooperating spot 170 has a channeled surface 240. The rear corresponding cooperating spot 180 is provided on the lower plate 120 for receiving the screw bolt 150 thereon.

In order to use the upper plate 110 and the lower plate 120 for manufacturing a denture of the present invention, it is required to first bring the upper plate 110 in close contact with the upper gum in the mouth of a patient who needs a denture and then bring the lower plate 120 in close contact with the lower gum.

In this process, the upper plate 110 and the lower plate 120 are supported to maintain horizontality at a predetermined level without inclining to aside from the gums by adjusting the height of the screw bolt 150 and the indicator teeth 160.

That is, with the upper plate 110 and the lower plate 120 inserted in the mouth of the patient, the vertical distance between upper and lower jawbones and the movement path of the lower jawbone are measured and adjusted so that the denture (the artificial teeth) can be arranged and directly examined as to whether they work well by adjusting the screw bolt 150 and the indicator teeth 160.

When the screw bolt 150 is turned in a predetermined direction, the screw bolt 150 is tightened in the screw nut 140, so the distance between the upper plate 110 and the lower plate 120 decreases, and in contrast, when the screw bolt 150 is turned in the opposite direction, the screw bolt 150 is loosed in the screw nut 140, so the distance between the upper plate 110 and the lower plate 120 increases.

Figure 2:
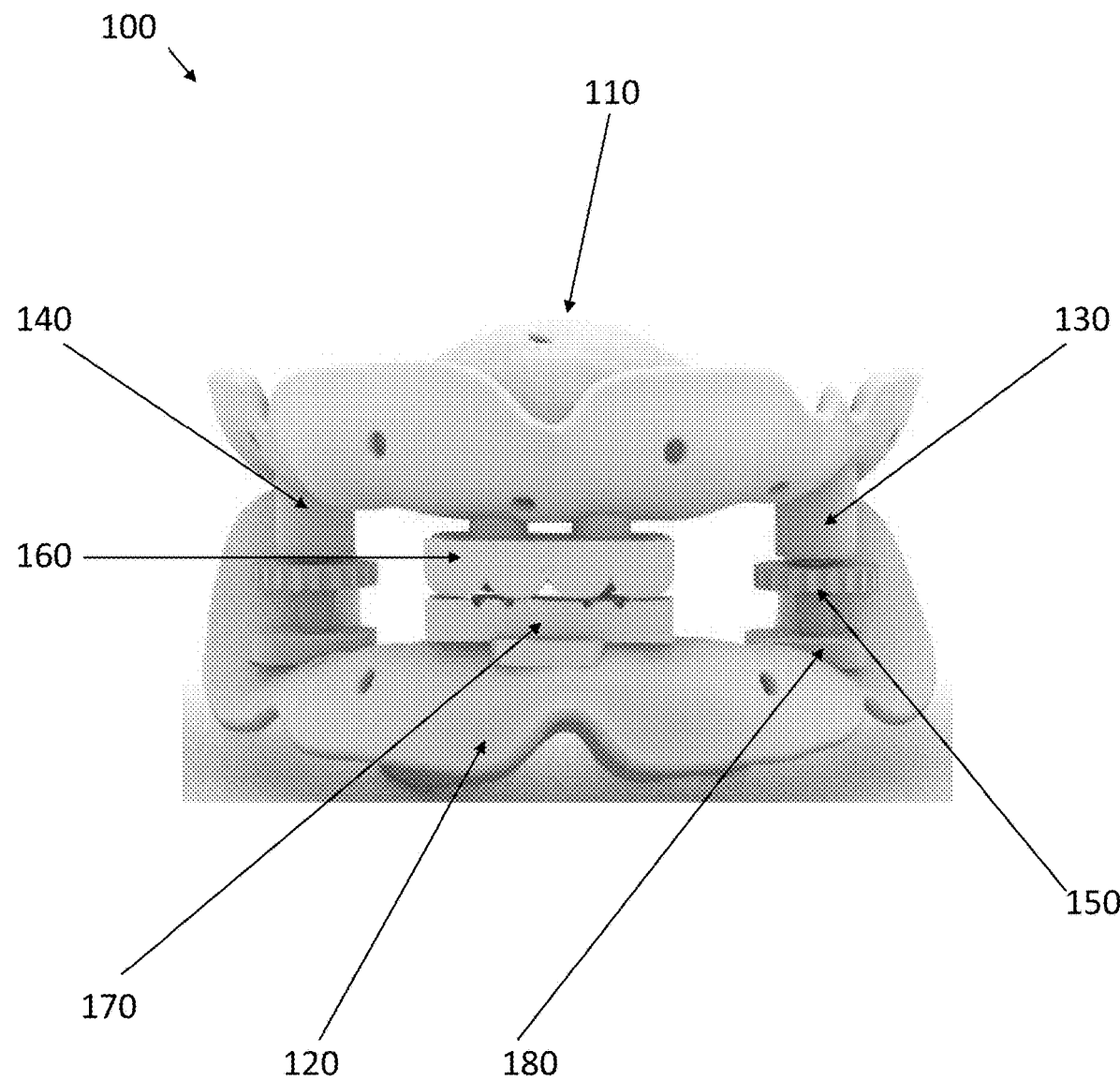
FIG. 2 illustrates a front view of a digital custom denture impression tray, in accordance with one embodiment of the present invention.

FIG. 2 illustrates a front view of a digital custom denture impression tray 100, in accordance with one embodiment of the present invention.

Referring to FIG. 2, the upper plate 110 is connected to the lower plate 120 by the indicator teeth 160 and the screw bolt 150. Accordingly, the front corresponding cooperating spot 170 on the lower plate 120 is positioned to receive the indicator teeth 160 and the rear corresponding cooperating spot 180 on the lower plate 120 is positioned to receive the screw bolt 150 so as to permit the flush disposition of the upper plate 110 on the lower plate 120. At this time, the vertical and centric relation of the patent's jaws can be recorded.

FIG. 3 illustrates an exploded bottom view of a digital custom denture impression tray 100, in accordance with one embodiment of the present invention. FIG. 4 illustrates an exploded top view of a digital custom denture impression tray 100, in accordance with one embodiment of the present invention.

Referring to FIGS. 3 and 4, the upper U-shaped plate 110 comprises an U-shaped insert element 260 having a base 210 and sidewalls 220 extending upwardly therefrom. The sidewalls 220 imitate a row of teeth follow the compensation curve of a natural set of teeth, on their oral side. The lower U-shapes plate 120 comprises an U-shaped insert element 250 having a base 200 and sidewalls 190 extending downwardly therefrom. The sidewalls 190 imitate a row of teeth follow the compensation curve of a natural set of teeth, on their oral side. The upper plate 110 and the lower plate 120 have substantially arcuately shaped planar configuration. The upper plate 110 and the lower plate 120 are U-shaped which can fit over the entire upper or lower set of teeth.

The upper plate 110 and the lower plate 120 are made of synthetic material safe for human use. The materials of the plates is typically formed of non-toxic plastic so as to keep the cost of such devices at a minimum, to facilitate sterilization, and also to provide the necessary inherent flexibility and resiliency needed for the plates to fit onto the patient's gems. Preferably, the upper plate 110 and the lower plate 120 are formed from a non-toxic semirigid plastic material and the sidewalls 190 are formed from a non-toxic flexible plastic material. In addition, the upper plate 110 and the lower plate 120 have a plurality of spaced holes 230 therethrough.

Using the digital custom denture impression tray 100 with a 3D scanning device, the dentist can capture not just the impression, but the bite registration and vertical dimension. And, this process of denture design is digitized, allowing for precision in fit and reduced appointment times. The scan is then forwarded to the dental lab for renderings and for printing of a 3D prototype. The lab examines the dentures and sends it to the dentist who places it with the patient. This makes final denture fittings at the second appointment a possibility.

The digital custom denture impression tray 100 disclosed herein enables a patient to considerably reduce the period and the cost for manufacturing a denture because the present invention could easily make a pattern (impression) by measuring the height of denture, and the vertical and centric relations of the patient's jaws by simply adjusting the indicator teeth 160 and the screw bolt 150 without taking such traditional impression steps which would require to repetitively measure such height and relations by adjustment of a wax rim.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A digital custom denture impression tray, comprising:
   an upper U-shaped plate for measuring the shape of a patient's upper gum having missing teeth and normal teeth arranged therein;
   a lower U-shaped plate for measuring the shape of the patient's lower gum, having missing teeth and normal teeth arranged therein, wherein the upper plate and the lower plate are adapted to be inserted in the mouth of the patient in superimposed relation;
   a height adjustment unit disposed on the upper plate for measuring the height of the denture to be implanted, wherein the height adjustment unit is structured to adjust horizontality and height of the upper plate and the lower plate;
   a screw nut attached to the height adjustment unit, wherein the screw nut has a threaded hole at a predetermined depth;
   a screw bolt having a threaded surface to adjust height by being inserted in the threaded hole from under the screw nut;
   an indicator teeth disposed on the front center of the upper plate for recording centric relation and guiding the upper plate toward the lower plate;
   a front corresponding cooperating spot provided on the lower plate for receiving the indicator teeth thereon; and
   a rear corresponding cooperating spot provided on the lower plate for receiving the screw bolt thereon.

2. The digital custom denture impression tray according to claim 1, wherein the upper U-shaped plate comprises an U-shaped insert element having a base and sidewalls extending upwardly therefrom.

3. The digital custom denture impression tray according to claim 2, wherein the sidewalls imitate a row of teeth that follow the compensation curve of a natural set of teeth, on their oral side.

4. The digital custom denture impression tray according to claim 1, wherein the lower U-shaped plate comprises an U-shaped insert element having a base and sidewalls extending downwardly therefrom.

5. The digital custom denture impression tray according to claim 4, wherein the sidewalls imitate a row of teeth that follow the compensation curve of a natural set of teeth, on their oral side.

6. The digital custom denture impression tray according to claim 1, wherein the front corresponding spot has a channeled surface.

7. The digital custom denture impression tray according to claim 1, wherein the upper plate and the lower plate have a plurality of spaced holes therethrough.

8. A digital custom denture impression tray, comprising:
   an upper U-shaped plate for measuring the shape of a patient's upper gum having missing teeth and normal teeth arranged therein;
   a lower U-shaped plate for measuring the shape of the patient's lower gum, having missing teeth and normal teeth arranged therein, wherein the upper plate and the lower plate are adapted to be inserted in the mouth of the patient in superimposed relation;
   a height adjustment unit disposed on the upper plate for measuring the height of the denture to be implanted, wherein the height adjustment unit is structured to adjust horizontality and height of the upper plate and the lower plate; and
   an indicator teeth disposed on the front center of the upper plate for recording centric relation and guiding the upper plate toward the lower plate.

9. The digital custom denture impression tray according to claim 8, wherein the upper U-shaped plate comprises an U-shaped insert element having a base and sidewalls extending upwardly therefrom.

10. The digital custom denture impression tray according to claim 9, wherein the sidewalls imitate a row of teeth that follow the compensation curve of a natural set of teeth, on their oral side.

11. The digital custom denture impression tray according to claim 8, wherein the lower U-shaped plate comprises an U-shaped insert element having a base and sidewalls extending downwardly therefrom.

12. The digital custom denture impression tray according to claim 11, wherein the sidewalls imitate a row of teeth that follow the compensation curve of a natural set of teeth, on their oral side.

13. The digital custom denture impression tray according to claim 8, wherein the height adjustment unit comprises a screw nut having a threaded hole at a predetermined depth.

14. The digital custom denture impression tray according to claim 13, wherein the screw nut comprises a screw bolt having a threaded surface to adjust height by being inserted in the threaded hole from under the screw nut.

15. A digital custom denture impression tray, comprising:
   an upper U-shaped plate for measuring the shape of a patient's upper gum having missing teeth and normal teeth arranged therein;

a lower U-shaped plate for measuring the shape of the patient's lower gum, having missing teeth and normal teeth arranged therein, wherein the upper plate and the lower plate are adapted to be inserted in the mouth of the patient in superimposed relation;

a screw nut attached to the lower U-shaped plate, wherein the screw nut has a threaded hole at a predetermined depth;

a screw bolt having a threaded surface to adjust height by being inserted in the threaded hole from under the screw nut;

an indicator teeth disposed on the front center of the upper plate for recording centric relation and guiding the upper plate toward the lower plate; and a front corresponding cooperating spot provided on the lower plate for receiving the indicator teeth thereon, wherein the front corresponding cooperating spot has a channeled surface;

a rear corresponding cooperating spot provided on the lower plate for receiving the screw bolt thereon.

16. The digital custom denture impression tray according to claim 15, wherein the upper U-shaped plate comprises an U-shaped insert element having a base and sidewalls extending upwardly therefrom.

17. The digital custom denture impression tray according to claim 16, wherein the sidewalls imitate a row of teeth that follow the compensation curve of a natural set of teeth, on their oral side.

18. The digital custom denture impression tray according to claim 15, wherein the lower U-shaped plate comprises an U-shaped insert element having a base and sidewalls extending downwardly therefrom.

19. The digital custom denture impression tray according to claim 18, wherein the sidewalls imitate a row of teeth that follow the compensation curve of a natural set of teeth, on their oral side.

20. The digital custom denture impression tray according to claim 15, wherein the upper plate and the lower plate have a plurality of spaced holes therethrough.

* * * * *